(12) United States Patent
Visotski et al.

(10) Patent No.: US 9,558,263 B2
(45) Date of Patent: Jan. 31, 2017

(54) IDENTIFYING AND DISPLAYING RELATIONSHIPS BETWEEN CANDIDATE ANSWERS

(71) Applicant: International Business Machines Corporation, Armonk, NY (US)

(72) Inventors: William G. Visotski, Lowell, MA (US); David E. Wilson, Lowell, MA (US); Robert L. Yates, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 14/097,697

(22) Filed: Dec. 5, 2013

(65) Prior Publication Data

US 2015/0161242 A1 Jun. 11, 2015

(51) Int. Cl.
*G06F 7/00* (2006.01)
*G06F 17/30* (2006.01)

(52) U.S. Cl.
CPC ... *G06F 17/30696* (2013.01); *G06F 17/30654* (2013.01); *G06F 17/30663* (2013.01); *G06F 17/30684* (2013.01); *G06F 17/30731* (2013.01)

(58) Field of Classification Search
CPC .............................................. G06F 17/30663
See application file for complete search history.

(56) References Cited

U.S. PATENT DOCUMENTS

| | | |
|---|---|---|
| 5,519,608 A | 5/1996 | Kupiec |
| 8,392,413 B1 * | 3/2013 | Grushetskyy ................ 704/205 |
| 2009/0287678 A1 | 11/2009 | Brown et al. |
| 2011/0066587 A1 | 3/2011 | Ferrucci et al. |
| 2011/0125734 A1 | 5/2011 | Duboue et al. |

(Continued)

FOREIGN PATENT DOCUMENTS

| | | | | |
|---|---|---|---|---|
| JP | 2007199876 A | * | 8/2007 | |
| JP | 2004021763 A | | 1/2016 | |
| WO | WO 2012040350 A1 | * | 3/2012 | ............... G09B 7/00 |

OTHER PUBLICATIONS

Conrad, Jack G. et al., "A System for Discovering Relationships by Feature Extraction from Text Databases", Proceedings of the 17th Annual International ACM, SIGIR Conference on Research and Development in Information Retrieval, 1994, pp. 267-270.

(Continued)

*Primary Examiner* — Ajith Jacob
(74) *Attorney, Agent, or Firm* — Francis Lammes; Stephen J. Walder, Jr.; Reza Sarbakhsh

(57) ABSTRACT

Mechanisms are provided for identifying commonalities between candidate answers generated by a Question and Answer (QA) system in response to an input question. The mechanisms receive a plurality of candidate answers for an input question from the QA system and identify terms present in the candidate answers. The mechanisms determine relationships between terms in each of the candidate answers and determine a common relationship between a first term and a second term, the common relationship being common amongst at least a subset of the plurality of candidate answers, based on the determined relationships between terms in each of the candidate answers. The mechanisms present the plurality of candidate answers and the common relationship to a user.

18 Claims, 7 Drawing Sheets

(56) References Cited

U.S. PATENT DOCUMENTS

| | | | |
|---|---|---|---|
| 2012/0078636 A1* | 3/2012 | Ferrucci | G06F 17/30654 704/270.1 |
| 2012/0078888 A1* | 3/2012 | Brown | G06F 17/30654 707/723 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |

OTHER PUBLICATIONS

Raghaven, Hema et al., "An Exploration of Entity Models, Collective Classification and Relation Description", ACM, Aug. 22-25, 2004, 10 pages.
USPTO U.S. Appl. No. 15/043,785, 1 page.
McCord, M.C. et al., "Deep parsing in Watson", IBM J. Res. & Dev. vol. 56 No. 3/4 Paper 3, May/Jul. 2012, pp. 3:1-3:15.
"Stanford CoreNLP", The Stanford Natural Language Processing Group, http://nlp.stanford.edu/downloads/corenlp.shtml, accessed Nov. 18, 2013, 5 pages.
Florian, R. et al., "A Statistical Model for Multilingual Entity Detection and Tracking", IBM TJ Watson Research Center, Proceedings of the 2004 Human Language Technology Conference, North American Chapter of the Association for Computational Linguistics Annual Meeting, http://acl/ldc.upenn.edu/hlt-naacl2004/main/pdf/128_Paper.pdf, 2004, 8 pages.
High, Rob, "The Era of Cognitive Systems: An Inside Look at IBM Watson and How it Works", IBM Corporation, http://ip.com/pdf/redbook/REDP495500.pdf, 2012, 16 pages.
Yuan, Michael J., "Watson and healthcare, How natural language processing and semantic search could revolutionize clinical decision support", IBM developerWorks, IBM Corporation, Apr. 12, 2011, 14 pages.

* cited by examiner

| CANDIDATE ANSWER COMMONALITY/RELATIONSHIP USER INTERFACE 700 | |
|---|---|
| CANDIDATE ANSWERS 710 | COMMONALITY/RELATIONSHIP OPTIONS 720 |
| Who was the greatest Red Sox player?<br><br>(1) Carl Yastrzemski<br>(2) Roger Clemens<br>(3) Ted Williams | ☐ IDENTIFY:<br>THE COMMON TERMS.<br>☐ COMMON ▽ (SELECT ENTITY TYPE)<br>☐ IN DOCS AFTER ____<br>☐ IN SOURCE: ▽<br>☒ THE COMMON RELATIONSHIPS. |
| EVIDENCE PASSAGES 740 | COMMON RELATIONSHIPS 730 |
| (1) Autographed by *Carl Yastrzemski*, *Carlton Fisk*, and Dwight Evans.<br><br>(2) Hall of Famer *Carlton Fisk* Blasts Mark McGwire, *Roger Clemens*<br><br>(3) Hence the less than admirable experts of nearly all of our Sports personalities – Wade Boggs, Fred Lynn, *Roger Clemens*, Nomar Garciaparra, Tito Francona, *Carlton Fisk*, and Johnny Damon just to name a few.<br><br>(4) "Oh my god," said a young woman in the stands, "*Ted Williams* threw a pitch to *Carlton Fisk*. I'm going home happy." | Carl Yastrzemski: Bobby Doerr; 7<br>Carl Yastrzemski: Carlton Fisk; 8<br>Carl Yastrzemski: Fred Lynn; 7<br>Roger Clemens: Carlton Fisk; 2<br>Roger Clemens: Fred Lynn; 1<br>Ted Williams: Bobby Doerr; 12<br>Ted Williams: Carlton Fisk; 2<br>Ted Williams: Fred Lynn; 1<br><br>Intersection: *Carlton Fisk* |

*FIG. 7*

IDENTIFYING AND DISPLAYING RELATIONSHIPS BETWEEN CANDIDATE ANSWERS

This invention was made with United States Government support under contract number 2013-1210100008. THE GOVERNMENT HAS CERTAIN RIGHTS IN THIS INVENTION.

BACKGROUND

The present application relates generally to an improved data processing apparatus and method and more specifically to mechanisms for identifying and displaying relationships between candidate answers generated by a Question and Answer (QA) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method is provided, in a data processing system, for identifying commonalities between the candidate answers generated either by a Question and Answer (QA) system in response to an input question or directly input for consideration by the Question and Answer (QA) system by a user. The method comprises receiving, by the data processing system or user input, a plurality of candidate answers for an input question from the QA system and identifying, by the data processing system, terms present in those candidate answers. The method further comprises determining, by the data processing system, relationships between terms in each of the candidate answers. Moreover, the method comprises determining, by the data processing system, a common relationship between a first term and a second term, the common relationship being common amongst at least a subset of the plurality of candidate answers, based on the determined relationships between terms in each of the candidate answers. In addition, the method comprises presenting, by the data processing system, the plurality of candidate answers and the common relationships.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an example diagram of a candidate answer user interface in accordance with one illustrative embodiment.

DETAILED DESCRIPTION

Figure 1:
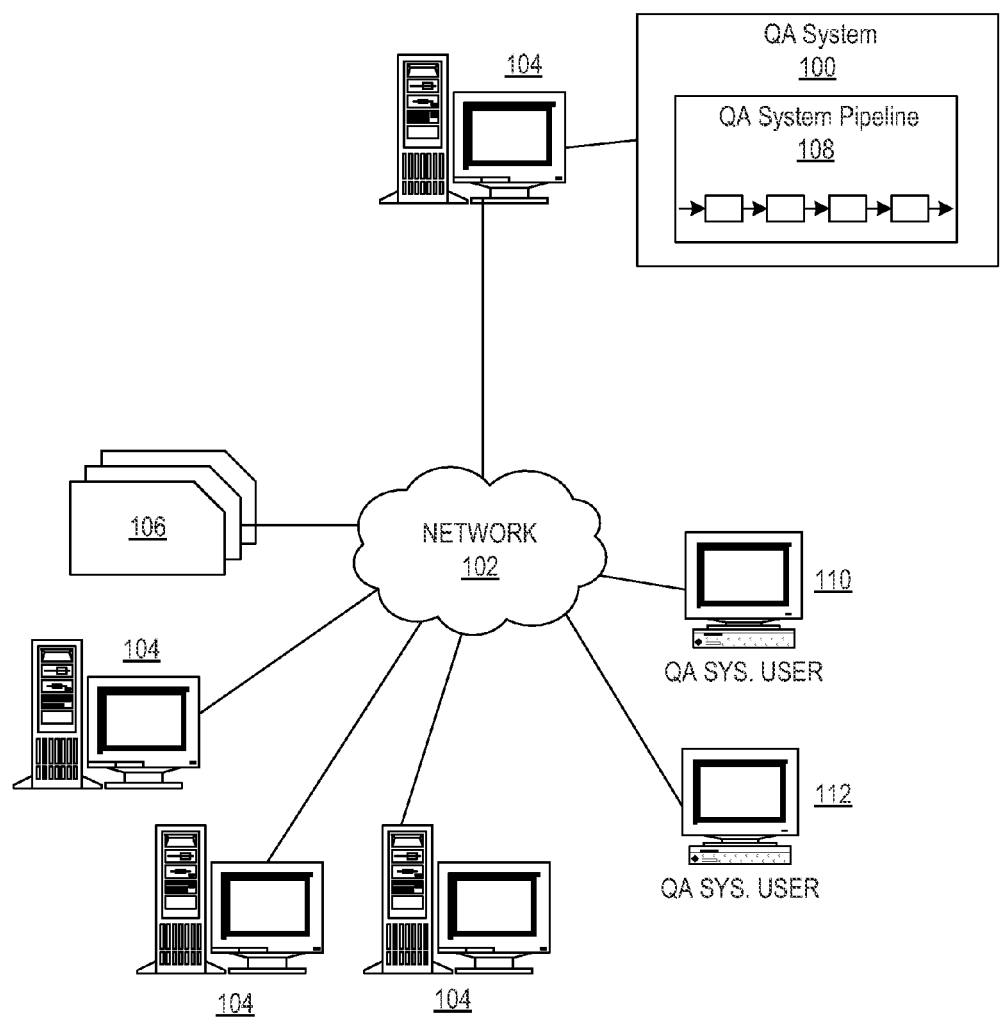
FIG. 1 depicts a schematic diagram of one illustrative embodiment of a question/answer creation (QA) system in a computer network.

The illustrative embodiments provide mechanisms for identifying relationships between candidate answers generated by a Question and Answer (QA) system. That is, the illustrative embodiments provide mechanisms for answering the question "Given a set of candidate answers calculated for a question by a QA system, what do the candidate answers have in common with one another?" The illustrative embodiments answer such a question by evaluating and representing the terms common to the elements in a set of candidate answers, by evaluating and representing the relationships between entities and terms within a candidate answer that are common amongst the candidate answers, and by retrieving and displaying the passages from the corpora which show the association between the candidate answers with reference to the common terms, and the entities and terms and their relationships.

It should be appreciated that the term "mechanism," as used herein, may be any implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The mechanisms of the illustrative embodiments create one or more data structures in one or more data stores, e.g., databases or the like, that identify relationships between entities identified in text of sentences in the documents. The mechanisms of the illustrative embodiments further associate entities with their co-references in a search index. As a result, these mechanisms may display the terms that are common to a set of candidate answers to a question, filter the terms in common by the entity type of the term (e.g., person, organization, or other term "type"), identify relationships between terms and entities, and display the passages that support the assertion that the candidate answers and the common terms are related.

The mechanisms of the illustrative embodiments may utilize an entity identification and tracking engine, such as the Statistical Information and Relation Extraction (SIRE) engine available from International Business Machines Corporation of Armonk, N.Y. SIRE provides components for term or entity detection using maximum entropy models that can be trained from annotated data, a trainable co-reference component for grouping detected terms in a document that correspond to the same entity, and a trainable relation extraction system. Of course other entity identification and tracking engines may be used without departing from the spirit and scope of the illustrative embodiments and SIRE is used herein only as an example to facilitate understanding of the improvements made by the illustrative embodiments.

The entity identification and tracking (EIT) engine provides a syntactic breakdown of text in a document, identification of entities detected in the text, co-reference resolution (resolution of two or more terms that refer to the same entity), and relationship detection between entities. In addition, logic is provided for generating search indices augmented with the co-referenced terms discovered by the EIT engine, and for generating a relational database that stores the entities found by the EIT engine, the entity type, terms related to the entities, the frequency of the particular relationship within a corpus or across corpora, the time of publication of the document that is the source of the relationship, the corpus identifier, and the document identifier of the document that is the source of the relationship.

These resources are used to identify entities, terms, and relationships in candidate answers generated by a QA system so as to identify relationships between candidate answers, other than the obvious relationship that the candidate answers are answers to a common input question. That is, the logic of the illustrative embodiments, given a set of candidate answers for an input question either returned by a QA system, or explicitly entered by a user to be considered by a QA system, displays the entities, terms, and their relationships linking the candidate answers (e.g., common terms amongst the candidate answers) that were returned and displays the passages from the corpora that support the answer/entity/term relationships. This identification of entities, terms, and relationships take into consideration the co-references of terms identified during the generation of the resources.

Thus, the results generated by the mechanisms of the illustrative embodiments may be output to a user so that the user can gain greater insight into the commonalities between the candidate answers and relationships between the candidate answers such that the user is given greater insight into the answer to their originally input question. For example, a user may be given options, such as through a user interface, to ask questions directed to the commonality of the candidate answers. Examples of such questions that may be asked, for example, may be "What terms do all of the answers have in common?" (and what are the passages from the documents of the corpus that show that the term and answer are related), "What terms does a subset of the answers have in common? (and what are the passages that show that the term and answer are related)", and the like. In some cases, the question may be directed to entity types to determine what entity types are common amongst the candidate answers, e.g., "What people do all of the answers have in common?" (where "people" is the entity type), "What organizations do all of the answers have in common?", "What countries do all the answers have in common?", and the like.

The results of the analysis performed by the mechanisms of the illustrative embodiments may be used to alter the display of the candidate answers based on the determined characteristics of the terms, relationships between terms, and the particular questions the user asks about the candidate answers. For example, if a user asks for an indication of the terms that are common amongst the candidate answers, the common terms may be highlighted in the candidate answers along with the passages in support of the relationship between the term and the particular candidate answer. Moreover, frequencies of relationships between terms and entities, within a corpus and/or across corpora, may be used as a measure of the strength of the relationship and may be used to modify the display of the candidate answer to represent the relative strengths of the relationships in the candidate answers, e.g., showing different strengths with different accentuation of color, font, size, or any other textual or graphical characteristic. Moreover, a measure of uniqueness of a relationship may also be used to modify the display of the candidate answers. Regardless of which of the above features are implemented, either individually or in combination, the illustrative embodiments provide greater insight into the reasoning behind why the candidate answers were selected as candidate answers for the input question and what is common amongst the candidate answers with regard to the terms used and the relationships between terms/entities mentioned in the candidate answers.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed above, the illustrative embodiments provide mechanisms for identifying entities, terms, and relationships between entities, between entities and terms, and the like, in candidate answers generated by a Question and Answer (QA) system. It should be appreciated that the mechanisms of the illustrative embodiments, in one aspect, operate as a pre-processor of documents of a corpus or corpora to generate resources which may be used to process the candidate answers of the QA system to identify relationships between the candidate answers. Thus, as a second aspect, the resources generated by the pre-processor mechanisms are then applied during runtime operation of the QA system to the candidate answers generated by the QA system to provide users with additional information regarding the relationships between candidate answers.

Figure 2:
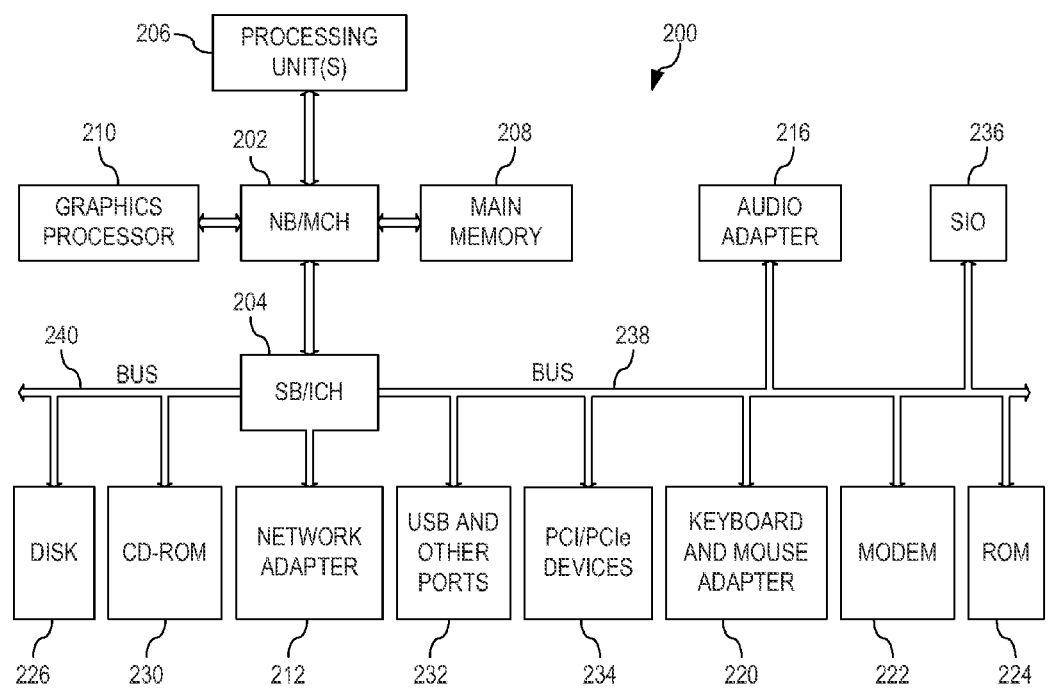
FIG. 2 is a block diagram of an example data processing system in which aspects of the illustrative embodiments may be implemented.
Figure 3:
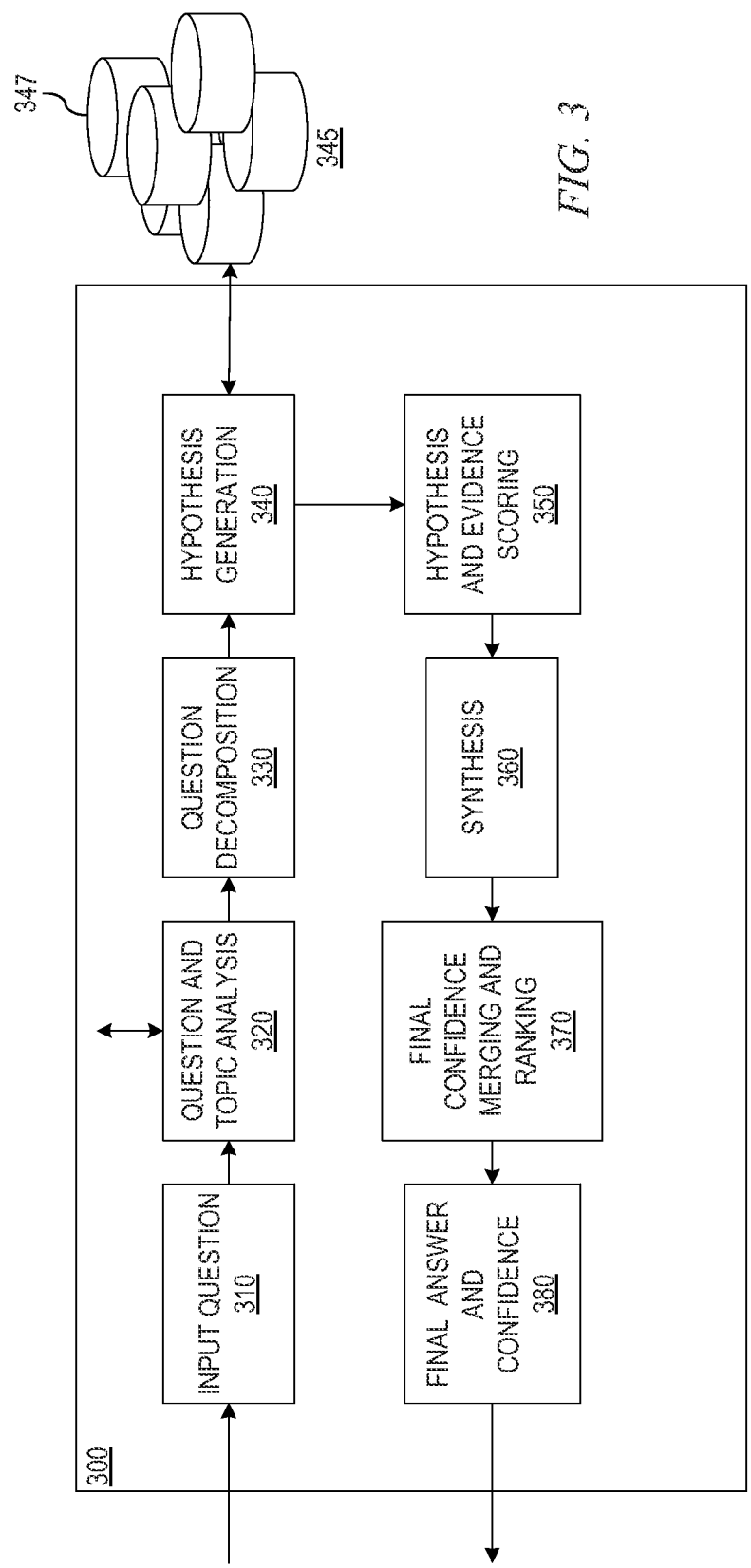
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to identifying and displaying relationships in and between candidate answers with regard to common or related entities and terms in these candidate answers.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be a different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

The illustrative embodiments provide mechanisms for utilizing a QA system, such as described above with regard to FIGS. 1-3, to answer input questions, and further provide mechanisms for analyzing the candidate answers generated by the QA system to identify common terms, entities, and relationships between terms and entities in the candidate answers. In addition, statistical measures associated with the terms, entities, and relationships between terms and entities are determined and used to modify the display of candidate answers and/or answer questions regarding commonalities between the candidate answers.

One aspect of the illustrative embodiments provides a pre-processor that analyzes documents in a corpus or corpora, such as corpus 347 or corpora 345 in FIG. 3, to generate resources storing information about terms, entities, relationships between terms and entities, and statistics about these terms, entities, and relationships for later use in analyzing commonalities in candidate answers generated by the QA system. In a second aspect of the illustrative embodiments, the resources are used to identify instances of the terms, entities, and relationships in candidate answers and draw conclusions regarding the commonalities and relatedness of the candidate answers. With regard to this second aspect, a user interface for presenting the candidate answers is generated and provided with mechanisms for answering questions regarding the commonalities between candidate answers, relatedness of the candidate answers, and for presenting supporting passages from the corpus or corpora in support of the commonalities and relationships between candidate answers, as well as providing mechanisms for highlighting or modifying the output of candidate answers based on the above.

Figure 4:
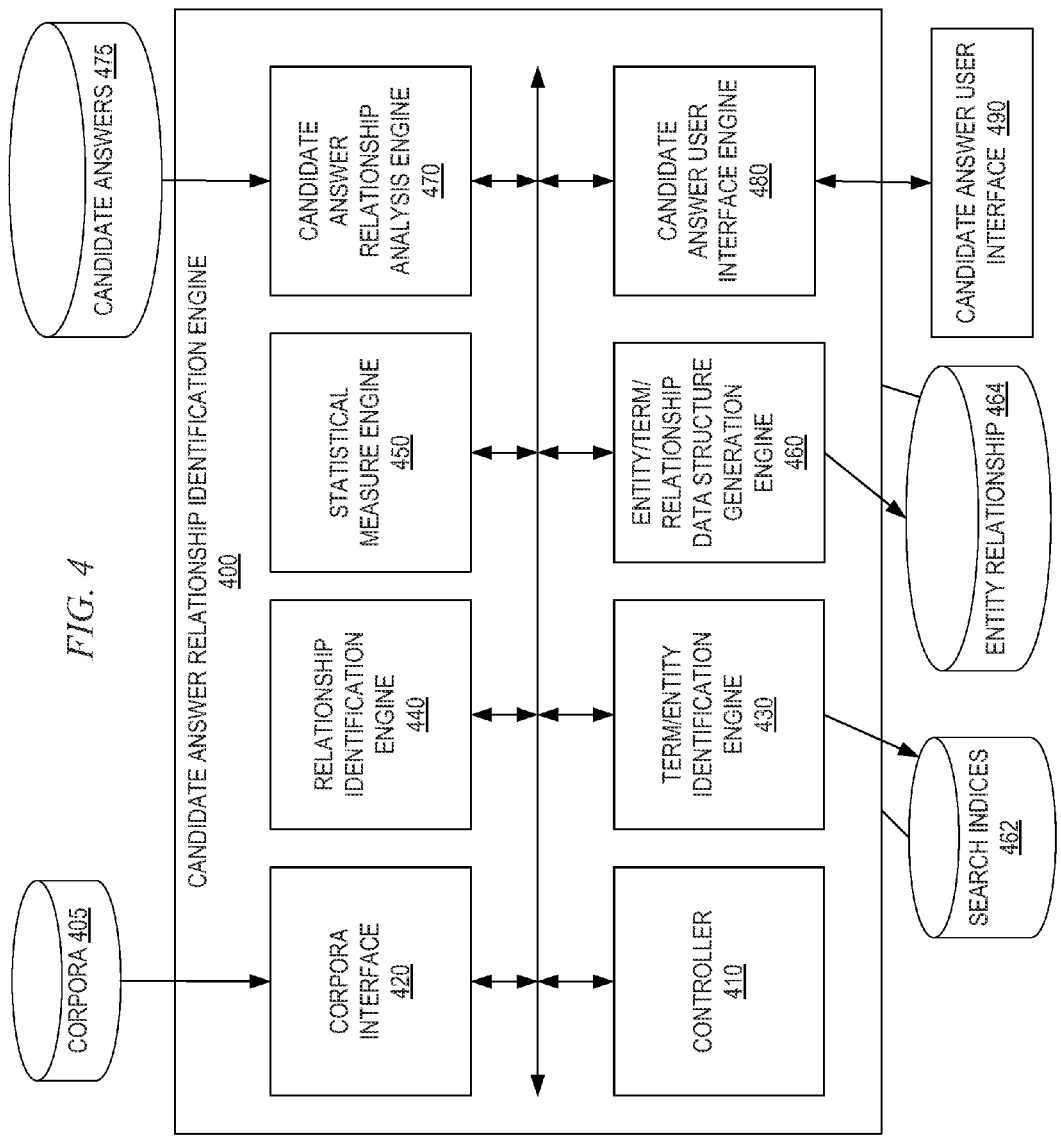
FIG. 4 is an example block diagram of the primary operational elements of a candidate answer relationship identification engine in accordance with one illustrative embodiment.

The various aspects of the illustrative embodiments will be described in greater detail hereafter with regard to FIG. 4. FIG. 4 is an example block diagram of the primary operational elements of a candidate answer relationship identification engine in accordance with one illustrative embodiment. The elements shown in FIG. 4 may be implemented in hardware logic, software logic executed by one or more hardware devices, or any combination of hardware logic and software logic. In one illustrative embodiment, the elements shown in FIG. 4 are implemented as software logic executed by one or more processors of one or more computing devices after loading the software logic into one or more memories, storage devices, or the like.

As shown in FIG. 4, the candidate answer relationship identification engine 400 comprises a controller 410, a corpora interface 420, a term/entity identification engine 430, a relationship identification engine 440, statistical measure engine 450, entity/term/relationship data structure generation engine 460, candidate answer relationship analysis engine 470, and candidate answer user interface engine 480. It should be appreciated that the example illustrative embodiment shown in FIG. 4 combines both the pre-processing aspects and logic with the post-processing aspects and logic into a single candidate answer relationship engine 400. For example, the elements 430-460 may be associated with the pre-processing aspects/logic of the illustrative embodiments while the candidate answer relationship analysis engine 470 and candidate answer user interface engine 480 may be considered part of the post-processing aspects/logic of the illustrative embodiments.

While FIG. 4 illustrates the pre-processing and post-processing aspects/logic as being part of the same engine 400, the illustrative embodiments are not limited to such. Rather, in other illustrative embodiments, the pre-processing and post-processing aspects/logic may be separate and distinct from one another where the post-processing aspects/logic may make use of the results generated by the pre-processing aspects/logic, e.g., data structures 462-464, to perform its post-processing aspects/logic. Thus, the pre-processing aspects/logic may be provided in a first engine on the same or different computing device as the post-processing aspects/logic which may be provided in a second engine. For ease of explanation herein, however, it will be assumed that the pre-processing and post-processing aspects/logic are integrated into the same candidate answer relationship identification engine 400.

The controller 410 of the candidate answer relationship identification engine 400 controls the overall operation of the candidate answer relationship identification engine 400 and orchestrates the operation of the other elements 420-480. The corpora interface 420 provides a data communication interface through which the candidate answer relationship identification engine 400 may obtain document data for a corpus or one or more corpora 405. The document data may be for unstructured documents and the document data may be document data for a training corpora or a runtime corpora upon which a Question and Answer (QA) system operates to generate candidate answers to input questions.

The term/entity identification engine 430, relationship identification engine, statistical measure engine 450, and entity/term/relationship data structure generation engine 460 may operate together to analyze the document data received from the corpora 405 and generated resource data structures 462-464 comprising information regarding the terms, entities, and relationships between terms and entities in the various documents. The elements 430-460 may make use of mechanisms in known tools to perform analysis of the document data. In one illustrative embodiment, the elements 430-460 may make use of the Statistical Information and Relation Extraction (SIRE) engine available from International Business Machines Corporation of Armonk, N.Y., or utilize similar logic to that provided in the SIRE engine. The SIRE engine is described in Florian et al., "A Statistical Model for Multilingual Entity Detection and Tracking," IBM TJ Watson Research Center, proceedings of the 2004 Human Language Technology Conference, North American Chapter of the Association for Computational Linguistics Annual Meeting, pages 1-8.

While the illustrative embodiments may make use of the SIRE engine to assist in generating the resource data structures 462-464, the illustrative embodiments are not limited to such. Rather, any analysis engine that is capable of analyzing input document data for an unstructured/structured document and generate resource data structures indicative of the terms/entities and their relationships may be used without departing from the spirit and scope of the illustrative embodiments. For example, another analysis engine that may be used with the mechanisms of the illustrative embodiments is the Stanford CoreNLP engine available from the Stanford Natural Language Processing Group. The Stanford CoreNLP engine, like the SIRE engine, provides sentence tokenization, syntactic analysis, entity detection, and co-reference resolution.

The term/entity identification engine 430 may make use of the logic of the SIRE engine, or other type of NLP analysis engine, to identify in each sentence of received document data the terms/entities in the sentence, the entity types found in the sentence, as well as maintain statistics about the identification of the terms/entities in the sentences of one or more documents input to the engine 400. The term/entity identification engine 430 may further perform co-reference identification to identify the co-references and their position within documents as well as the entities to which they refer. The relationship identification engine 440 analyzes the relationships between the terms/entities found in the sentence to identify pairs of terms/entities, the nature of the relationship between the terms/entities, and the frequency of the relationship found in the document or documents of the corpora 405, and the like. In this way, for each entity or term in a document, one or more pairwise relationships with other terms/entities may be identified and persisted.

For example, in one sentence, there may be multiple relationships, co-references, and the like identified. The term/entity identification engine 430 tokenizes or otherwise identifies the terms/entities within the sentence and their location and type. The relationship identification engine 440 identifies the various relationships between the terms/entities found by the term/entity identification engine 430.

Consider the following example sentences: "John Smith is a Patent Attorney and he is registered with the United States Patent and Trademark Office (USPTO). He graduated from Harvard in 2004 and he currently resides in New York." In one sentence, the entities "John Smith," "Patent Attorney", "United States Patent and Trademark Office," and "USPTO" may be identified using the NLP mechanisms, such as are provided in the SIRE engine, for example. The entity types for the entities may further be identified such that "John Smith" is associated with the entity type "person," "patent attorney" is associated with the entity type "occupation," and "United States Patent and Trademark Office" is an "organization." In addition, the co-references "he" (pronoun) and "USPTO" (acronym) are identified in the sentence with their relationships being that "he" refers to "John Smith," and "USPTO" refers to the United States Patent and Trademark Office.

Pairwise relationships between the entities and terms are identified such that "John Smith" is related to "Patent Attorney" in one pairwise relationship, to "United States Patent and Trademark Office" in a second pairwise relationship, to "Harvard" in a third, 2004 in a fourth, and New York in a fifth pairwise relationship. Similarly, the entity "Patent Attorney" may have a relationship with "John Smith" as does the entity "United States Patent and Trademark Office." Each pairwise relationship may be persisted in association with the particular entity, e.g., an entry in a database for "John Smith" may persist its pairwise relationship with "Patent Attorney" and with "United States Patent and Trademark Office."

The relationship identification engine 440 may further perform co-reference identification and resolution to determine the entity nouns to which the co-references refer. For example, the pronoun "he" in the above example refers to "John Smith" whereas the acronym "USPTO" refers to the organization "United States Patent and Trademark Office." When representing relationships between entities, the co-reference may be replaced with the entity to which it refers, i.e. the entity is persisted in place of the co-reference in order to generate pairwise relationships, e.g., "United States Patent and Trademark Office" may be persisted instead of "USPTO" in the pairwise relationships.

Moreover, the term/entity identification engine 430 may further identify other non-entity nouns and verbs in the sentence, such as within a particular window of text, e.g., within 5 grams that include the entity and the co-located nouns and verbs in the sentence. Thus, in the above example, "John Smith" may be associated with the verb "registered" and "United States Patent and Trademark Office" may also be associated with the verb "registered." Thus, from this association, one can determine that John Smith may be registered and entities may be registered with the United States Patent and Trademark Office.

It should be appreciated that while the above example is for only two sentences, pairwise relationships may span a large number of sentences in a document. Thus, co-references and the like may be in a subsequent sentences and may refer to an entity in a previous sentences one or a plurality of sentences earlier in the content of the document. The position of the entities and their co-references in the document may be persisted so that it is known which co-references refer to which entities.

In accordance with the illustrative embodiments, the information generated by the term/entity identification engine 430 and relationship identification engine 440 may be processed by the statistical measure engine 450 to identify relationship frequencies for each pairwise relationship identified within a corpus and/or across multiple corpora. That is, for a single relationship, the number of times that relationship was identified in sentences of one or more documents of the corpora 405 is maintained and used to generate a frequency statistic for the relationship. Moreover, the statistical measurement engine 450 may also calculate other types of statistics for the various terms/entities and relationships identified by the term/entity identification engine 430 and relationship identification engine 440. For example, another statistic that may be generated is the inverse document frequency (IDF) which is a measure of the rarity of a term/entity/relationship. The more rare a relationship is within the documents of the corpora 405, the more unique that relationship is. Relationships with terms that have low IDF scores may be discarded and no longer persisted since there is little support in the corpora 405 for the identified relationship.

Thus, through operation of the term/entity identification engine 430, the relationship identification engine 440, and the statistical measure engine 450, relationships within documents of the corpora 405 are identified where each of these relationships comprise two terms/entities, and each term/entity may have multiple relationships. For each relationship, the entity types of the two terms/entities and the relationship frequency are persisted. The relationship frequency persisted is the running total of all instances of the relationship across all of the documents in the corpus/corpora. In addition, other attributes of the relationship may be persisted as well including, but not limited to, a corpus identifier that identifies the corpus of the document(s) in which the relationship was identified, a document identifier that identifies the document(s) in which the relationship was identified, a timestamp on the document(s) in which the relationship was identified. The additional information is persisted so that the query for the relationships can be scoped or filtered. For example, the corpus Id may be used to filter the returned relationships to only a selected corpus. Similarly, the document ID may be used to filtered the returned relationships to a set of documents. The timestamp may be used to filter the returned relationships that existed before or after a particular date and time or between specified date and time X and date and time Y.

The co-references generated for each document in the corpora 405 analyzed by the candidate answer relationship identification engine 400 are added to the corpora of data/information 345. These co-references allow for additional candidate answers to be generated during Hypothesis Generation (304) and enable the return of the correct supporting passages which include a co-referenced entity in supporting the assertion of a relationship between entities.

The entity/term/relationship data structure generation engine 460 persists the relationship and index information gathered by the engines 430-450 in search indices 462 and entity relationship data structures 464. Again, the entity relationship data structures 464 store entries for each relationship between entities/terms found by the relationship identification engine 440 and each entry stores the entities of the relationship, the entity types, the terms related to the entities, the frequency of the relationship across all documents in the corpora, the time of publication of the document(s) in which the relationship was found, the corpus identifier of the document(s) in which the relationship was found, and the document identifier of the document(s) in which the relationship was found. The search indices 462 comprise indices for each of the documents with the indices storing metadata identifying the co-references in the document, the positions of the co-references, and the entities to which the co-references refer. The search indices 462 may be part of resources 345 and 347 and may be used during Questions and Answering Hypothesis generation. The search indices 462 are augmentation search indices of the type used by the QA system, e.g., augmented portions of elements 345 and 347, with co-reference information. The search indices 462 are used (1) during Questions and Answering Hypothesis generation to improve the set of candidate answers and (2) to provide supporting passages as evidence for relationships.

The above operations to generate the resources 462-464 are part of a pre-processing of the corpora 405 to generate resources 462-464 which can be used during runtime operation to generate candidate answers, analyze the relationships of and between candidate answers generated by a QA system in response to an input question, and return the correct passages that support the relationship. That is, during runtime, the QA system, such as shown in FIGS. 1-3, may receive an input question and generate a plurality of candidate answers (obtained from the corpora 345 or a corpus 347, which may be the corpora 405 as well) for the input question. Additional candidate answers will be generated based on results returned from querying the co-referenced terms stored in search indices 462. The candidate answers 475 may be input to the candidate answer relationship identification engine 400. The candidate answer relationship analysis engine 470 utilizes the resource 464 to analyze the candidate answers to identify the entities and their relationships present in the candidate answers and thus, the commonality between the candidate answers 475 with regard to the entities/terms/and relationships found in each of the candidate answers 475.

The operation of the candidate answer relationship analysis engine 470 may be initiated automatically or in response to a user input to a user interface requesting the identification of commonalities between the candidate answers. For example, the candidate answers may be output to a user via a candidate answer user interface 490. The user interface may be generated by a candidate answer user interface engine 480 and may include user interface elements that are selectable by a user to request additional information about the candidate answers, such as the commonalities between the candidate answers.

The candidate answer relationship analysis engine 470 compares the terms/entities in the candidate answers with the relationships stored in the entity relationship data structures 464 to identify matching entries in the entity relationship data structures 464 and retrieve the corresponding relationships. Thus, for example, if a candidate answer has the entity "Patent Attorney" in it, then the relationships of "Patent Attorney" in the entity relationship data structures 464 will be identified and retrieved. In retrieving the entity relationships, the various statistical measures, e.g., frequency of occurrence, inverse document frequency, or the like, stored in association with the entity relationships are retrieved as well. Moreover, through identification of the document identifier, corpus identifier, and position information for the entities, the particular passages in the corpora 405 that support the relationship of the entity are able to be retrieved.

After finding the pairwise relationships in the entity relationship data structures 464 that match the terms/entities found in the candidate answers, the candidate answer relationship analysis engine 470 determines the intersection of the relationships for each pair of candidate answers, triplet of candidate answers, all answers, or the like. Thus, for example, the analysis may identify that candidate answer 1 has a relationship with the entity "John Smith" and candidate answer 2 also has a relationship with the entity "John Smith" even though candidate answer 2 may not specifically include the name "John Smith" in the candidate answer. One cannot obtain these types of results merely from the passages returned for the candidate answers—for example, the passages returned may contain pronouns, but not the object of the pronoun—thus, the answer would have a relation with the object of the pronoun, but one would have no way of knowing what the object is at that point. The relations data store contains the relationship between the entity and the co-referenced resolved object of the pronoun as discussed above. In addition, the passages returned with each candidate answer are exclusive to answering the posed input question, whereas the relationships returned by the mechanisms of the illustrative embodiments span the entire corpora and thus, may present relationships between candidate answers that are not directly related to the input question being asked or the passages that support the candidate answers.

Various options may be presented to the user via the user interface 490 generated by the candidate answer user interface engine 480 through which the user may request additional information about the candidate answers including specific types of entities that are common to all or a subset of the candidate answers or other types of commonalities between the candidate answers. For example, the user may be presented, via the user interface 490, options for asking:

(1) what terms do all of the candidate answers have in common and what the passages are that show that the terms and the answers are related to one another?

(2) what terms does a subset of the candidate answers have in common and what are the passages that show that the term and the answer are related?

(3) What people do all of the candidate answers have in common?

(4) What organizations do at least 3 of the 5 candidate answers have in common in documents published since 2011?

(5) What countries do all of the candidate answers have in common using only Wikipedia as a source?

In these examples, questions such as (3) above, which are directed to a particular type of entity that is common amongst the candidate answers, may be answered since the entity relationship data structures 464 store entity type information for the entities in each of the relationships and thus, when identifying which relationships apply to each of the candidate answers, the entity types are also identified. With regard to question (4) above, since the timestamps associated with the sources of the relationships, e.g., documents in the corpora 405, are maintained in the entries, the identification of organizations in documents of a particular time frame may be identified. With regard to question (5), because source information is maintained in the entries of the entity relationship data structures 464, again this question may be answered with regard to particular sources of interest.

The statistical measure information associated with entries in the entity relationship data structures 464 may be used to modify the representation of the relationships in and between the candidate answers. For example, relationships in and between the candidate answers that have a higher frequency of occurrence may be visually distinguished or highlighted in relation to other relationships in and between the candidate answers. The common terms/entities in the candidate answers may be distinguished or highlighted in the candidate answers, the relationships determined to be common amongst the candidate answers may be presented and distinguished/highlighted in accordance with the relative ranking of frequency of occurrence, or inverse document frequency, or the like. For example, if the relationship between "Barack Obama" and "John Boehner" has a frequency of occurrence of 50 and the relationship between "Barack Obama" and "Rahm Emanuel" has a frequency of 5 within a particular corpus or corpora 405, then the first relationship may be distinguished in its representation in the user interface from that of the second relationship so as to accentuate or highlight the first relationship. Similarly, using uniqueness, or inverse document frequency, if the frequency of "John Boehner" in all relationships is 2000, and the frequency of "Rahm Emanuel" in all relationships is 10, the uniqueness of the "Barack Obama"/"Rahm Emanuel" relationship (5/10) is greater than the uniqueness of the "Barack Obama"/"John Boehner" relationship (50/2000) and this difference in uniqueness may be visually represented by distinguishing one relationship over the other.

Furthermore, the passages within the corpus or corpora 405 that support the particular common relationships in the candidate answers 475 may be displayed as part of the user interface as well. Thus, not only is the user presented with information about the common terms/entities in the candidate answers, the common relationships between the candidate answers, and the relative frequency/uniqueness of the relationships, but the user is also presented with the documentary support for the relationships.

As an example, consider an input question to a QA system such as "Who was the greatest Red Sox player?" The candidate answers returned by the QA system may include "Carl Yastrzemski," "Roger Clemens," and "Ted Williams." The candidate answer relationship analysis engine of the illustrative embodiments may then be queried for commonalities between these candidate answers using "Carl Yastrzemski," "Roger Clemens," and "Ted Williams" as input. In this example, the entity relationship data store 464 is queried for the 3 candidate answers and returns the following results (where the number indicates the frequency of the relationships between the entities specified in the pairing occurring in the documents of the corpora):

Carl Yastrzemski: Bobby Doerr; 7
Carl Yastrzemski: Carlton Fisk; 8
Carl Yastrzemski: Fred Lynn; 7
Roger Clemens: Carlton Fisk; 2
Roger Clemens: Fred Lynn; 1
Ted Williams: Bobby Doerr; 12
Ted Williams: Carlton Fisk; 2
Ted Williams: Fred Lynn; 1

From this set of pairwise relationships, one can see that Bobby Doerr has a relationship with Carl Yastrzemski and Ted Williams but not Roger Clemens (indicating that perhaps Bobby Doerr played at the same time as Carl Yastrzemski and Ted Williams but not Roger Clemens (Doerr actually placed with Williams and coached Yastrzemski). Moreover, it can be seen that Carlton Fisk appears in relationships with what the QA system considered the greatest Red Sox players, i.e. the three candidate answers, which is indicative that perhaps the user may want to add Carlton Fisk as a possible candidate answer to be considered by the QA system. Thus, the mechanisms of the illustrative embodiments may analyze these relationships, identify the intersection of the pairwise relationships as being "Carlton Fisk" and may provide this additional information to the user in addition to the relationships leading to the conclusion of the intersection of the relationships.

Moreover, in addition to the relationships, their statistics, and the intersection of the relationships being presented to the user by the mechanisms of the illustrative embodiments, evidence passages that support the various relationships that lead to the intersection may be returned as well so that the user may further determine the relevance or importance of the common relationships and the intersection of these common relationships. For example, example passages to support the above relationships may be of the following types (note that the first passage is found because "Yaz" is resolved through co-referencing to "Carl Yastrzemski" and the last passage is found because "Lynn" is resolved through co-referencing to "Fred Lynn."

(1) Red Sox to honor Yaz with Fenway Park statue between the Ted Williams statue, whom Yaz succeeded in left field in 1961, and "The Teammates" statue depicting Dom DiMaggio, Johnny Pesky, Bobby Doerr, and Williams.
(2) Carl Yastrzemski, Jim Rice, and Fred Lynn 11×14 photo double matted to a 16×20 picture.
(3) Autographed by Carl Yastrzemski, Carlton Fisk, and Dwight Evans.
(4) Hall of Famer Carlton Fisk Blasts Mark McGwire, Roger Clemens
(5) Hence the less than admirable experts of nearly all of our Sports personalities—Wade Boggs, Fred Lynn, Roger Clemens, Nomar Garciaparra, Tito Francona, Carlton Fisk, and Johnny Damon just to name a few.
(6) In 1939, Ted Williams' rookie season with the Sox, Doerr began a string of 12 consecutive seasons with 10 or more home runs and 73 or more runs batted in; in 1940 the Red Sox became the $12^{th}$ team in major league history to have four players with 100 RBI, with Foxx, Williams, Cronin, and Doerr each collecting at least 105.
(7) "Oh my god," said a young woman in the stands, "Ted Williams threw a pitch to Carlton Fisk. I'm going home happy."
(8) A private man, like one of his predecessors with the Red Sox, Ted Williams, Lynn will be a conspicuous absentee on the rubber-chicken and stomach-pump circuit.

Thus, the illustrative embodiments provide mechanisms for identifying and presenting information identifying the commonality and relationships between candidate answers. This information provides greater insight into the answer to the input question submitted by the user and potentially the reasoning behind the answer that is returned for the input question. The user may request various types of additional information about the candidate answers which can be informative to the user when determining the reasons why the QA system selected the candidate answers and ultimately the final answer to the input question as well as present information that may be used to guide the user to further understanding of the subject matter of the candidate answers.

Figure 5:
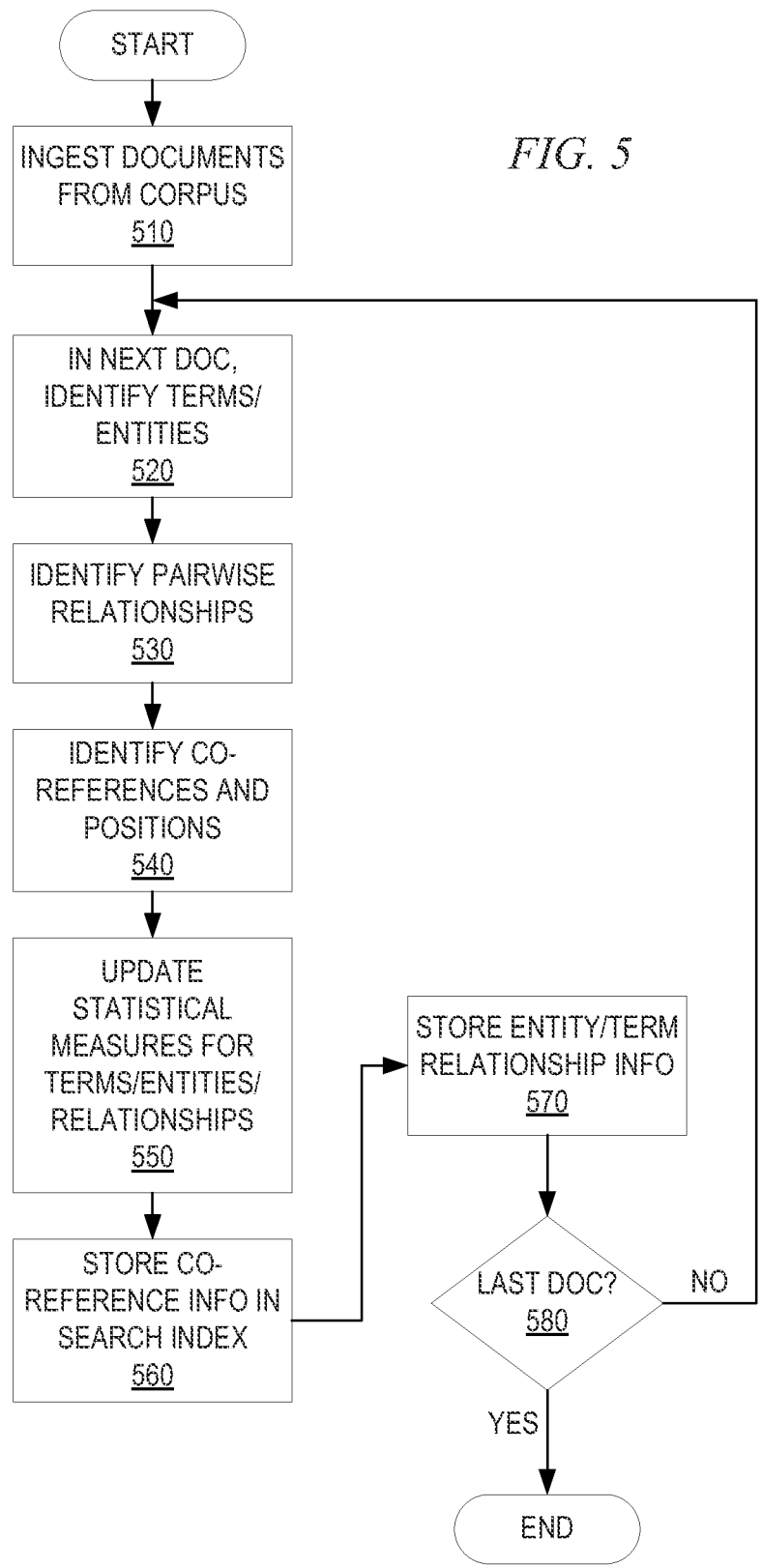
FIG. 5 is a flowchart outlining an example operation for performing a pre-processing operation for generating entity/term relationship resources for use in identifying relationships in candidate answers in accordance with one illustrative embodiment.

FIG. 5 is a flowchart outlining an example operation for performing a pre-processing operation for generating entity/term relationship resources for use in identifying relationships in candidate answers in accordance with one illustrative embodiment. As shown in FIG. 5, the operation starts by initiating an ingestion of documents from a corpus or corpora (step 510). For the next document in the corpus/corpora, the document data is analyzed to identify terms/entities mentioned in the document data including any co-references to entities (step 520). Pairwise relationships between entities and other entities, entities and other non-entity terms, and the like, are identified (step 530). Positions of co-references and the entities to which they refer are identified in the document data (step 540). Statistical measures associated with the terms/entities/relationships are updated (step 550), such as the frequency of occurrence of the terms/entities/relationships, inverse document frequencies, and the like. The information for the co-references, their positions, and the entities to which they refer is stored in a search index for the document (step 560). The entity/term relationship information is stored in entries in the entity relationship data structures (step 570). The operation then determines if the last document has been processed (step 580). If not, the operation returns to step 520; otherwise the operation terminates.

Figure 6:
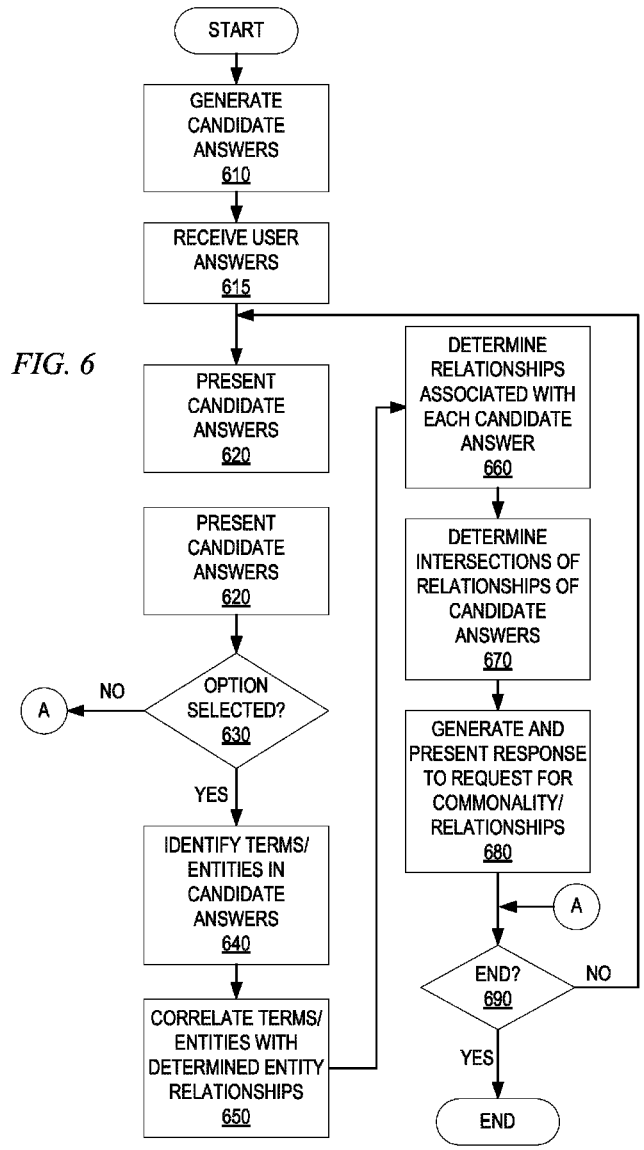
FIG. 6 is a flowchart outlining an example operation for determining relationships between candidate answers using entity/term relationship resources in accordance with one illustrative embodiment.

FIG. 6 is a flowchart outlining an example operation for determining relationships between candidate answers using entity/term relationship resources in accordance with one illustrative embodiment. The operation starts with the generation of candidate answers to an input question (step 610) and answers entered by the user to be considered by the QA system (step 615). The candidate answers are presented to a user via a user interface (step 620) which further includes one or more user selectable options for obtaining information regarding the commonalities and relationships between candidate answers. A determination is made as to whether a user selectable option for obtaining commonality/relationship information for the candidate answers is received (step 630). If so, the candidate answers are analyzed to identify terms/entities in the candidate answers (step 640) and correlate these terms/entities with entity relationships stored in the entity relationship data structures (step 650). Based on the correlation, relationships associated with each of the candidate answers are determined (step 660). The intersections of the relationships of the candidate answers is determined (step 670) and, based on the intersections, the response to the request for commonality/relationship information is generated and returned to the user via the user interface (step 680). A determination is then made as to whether presentation of the user interface is to be terminated, e.g., the user closes the user interface, inputs a new question, or otherwise indicates that the user interface is no longer needed (step 690). If so, then the operation terminates. Otherwise, the operation returns to step 630 to determine if the user has requested any other commonality/relationship information for the candidate answers and the operation repeats with regard to the new request.

FIG. 7 is an example diagram of a candidate answer user interface in accordance with one illustrative embodiment. For consistency, the example shown in FIG. 7 corresponds to the example input question "Who was the greatest Red Sox player?" discussed above. This is only an example and is not intended to state or imply any limitation as to the types of user interfaces that may be used with or generated by the mechanisms of the illustrative embodiments. Many modifications to the depicted example user interface may be made without departing from the spirit and scope of the illustrative embodiments.

As shown in FIG. 7, the user interface has a first portion 710 for displaying the candidate answers generated in response to an input question. A second portion 720 is provided for presenting a plurality of user selectable interface elements for requesting commonality/relationship information for the candidate answers. A third portion 730 is provided for presenting the common relationships between the candidate answers. A fourth portion 740 may be provided for presenting evidence passages in support of the relationships identified in the third portion 730.

In operation, when a user inputs a question to a QA system and the QA system returns candidate answer results, the candidate answers may be presented in the first portion 710, such as in a ranked listing based on the degree of confidence associated with the candidate answers. In response to the presentation of the candidate answers in the first portion 710, the user may determine that additional information about the commonalities/relationships between the candidate answers would be helpful or informative to the user. Thus, the user may select a desired option from the options presented in the second portion of the user interface, e.g., an option to identify all of the terms/entities common to each of the candidate answers (even if they are not specifically mentioned in the candidate answers themselves), an option for determining common types of entities amongst the candidate answers (e.g., what people, organizations, or countries are common amongst the candidate answers), and the like.

In response to the user selection of one or more of the options in the second portion 720, the common terms/entities/relationships between the candidate answers in the first portion 710 are determined and common relationships may be presented to the user via the third portion 730. In addition, common terms/entities in the common relationships may be accentuated or highlighted in the first portion 710. Moreover, evidence passages that support the relationship between the entities in the common relationships may be retrieved and presented via the fourth portion 740. Thus, via the user interface, commonalities and relationships between candidate answers generated for an input question may be identified and presented to a user.

It should be appreciated that while the illustrative embodiments described above are directed to identifying common relationships amongst at least a subset of the candidate answers generated by a QA system using previously stored pairwise relationships between terms and/or entities found during pre-processing of documents in one or more corpora, the illustrative embodiments are not limited to such. Rather, any type of relationships may be used as a basis for performing the identification of a common relationship amongst the subset of candidate answers. Thus, more complex relationships than pairwise relationships, e.g., relationships comprising three or more terms/entities, may be utilized and the intersection of these more complex relationships may be generated in accordance with the mechanisms previously described.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:
   receive a plurality of candidate answers for an input question from a Question and Answer (QA) system;
   identify terms present in the plurality of candidate answers;
   determine relationships between terms the plurality of candidate answers;
   determine a common relationship between terms in a subset of the plurality of candidate answers, the common relationship being between a first term and a second term in each candidate answer of the subset of the plurality of candidate answers based on the determined relationships between terms the plurality of candidate answers; and
   present the plurality of candidate answers and the common relationship to a user.

2. The computer program product of claim 1, wherein the computer readable program further causes the computing device to determine the common relationship by determining an intersection of the relationships between terms in the subset of the plurality of candidate answers.

3. The computer program product of claim 1, wherein the computer readable program further causes the computing device to determine the common relationship:
   searching a relationship data store comprising a plurality of entries, each entry corresponding to a relationship between a first found term and at least one second found term found during pre-processing of documents of at least one corpus; and
   for a term found in a candidate answer in the plurality of candidate answers, identifying one or more entries in the relationship data store that match the term.

4. The computer program product of claim 3, wherein each entry in the relationship data store comprises a pairwise relationship between a first term found during pre-processing of at least one document of a corpus, and a second term found during pre-processing of the at least one document of the corpus, based on relationships identified in the at least one document of the corpus through natural language processing of the at least one document of the corpus.

5. The computer program product of claim 4, wherein each entry in the relationship data store further comprises a corresponding frequency of occurrence value indicating a frequency at which a corresponding pairwise relationship was found in the at least one document of the corpus during the pre-processing.

6. The computer program product of claim 5, wherein the computer readable program further causes the computing device to present the plurality of candidate answers and the common relationship to the user by generating a visual display of the plurality of candidate answers and the common relationship along with the corresponding frequency of occurrence value for the common relationship.

7. The computer program product of claim 6, wherein the visual display further comprises at least one evidence text passage from at least one document of a corpus that supports the common relationship, and wherein portions of at least one of the subset of the plurality of candidate answers or the evidence text passages are accentuated in the visual display based on a value corresponding to the frequency of occurrence value for the common relationship.

8. The computer program product of claim 1, wherein the computer readable program further causes the computing device to determine the common relationship between terms in the subset of the plurality of candidate answers by:
presenting a graphical user interface (GUI) providing a first portion of the GUI for outputting the plurality of candidate answers, a second portion of the GUI for outputting a plurality of user selectable options for specifying a desired common relationship that the user wishes to have identified between the plurality of candidate answers, a third portion of the GUI for outputting the relationships between terms in the plurality of candidate answers and the common relationship between terms in the subset of the plurality of candidate answers, and a fourth portion of the GUI for outputting evidence text passages from documents of a corpus that support the common relationship between terms in the subset of the plurality of candidate answers.

9. The computer program product of claim 1, wherein the computer readable program further causes the computing device to present the plurality of candidate answers and the common relationship between terms in the subset of the plurality of candidate answers to the user by generating a visual display of the plurality of candidate answers and at least one evidence text passage from at least one document of a corpus that support the common relationship between terms in the subset of the plurality of candidate answers, with portions of at least one of the subset of the plurality of candidate answers, or the at least one evidence text passage, being accentuated in the visual display.

10. An apparatus comprising:
a processor; and
a memory coupled to the processor, wherein the memory comprises instructions which, when executed by the processor, cause the processor to:
receive a plurality of candidate answers for an input question from a Question and Answer (QA) system;
identify terms present in the plurality of candidate answers;
determine relationships between terms the plurality of candidate answers;
determine a common relationship between terms in a subset of the plurality of candidate answers, the common relationship being between a first term and a second term in each candidate answer of the subset of the plurality of candidate answers based on the determined relationships between terms the plurality of candidate answers; and
present the plurality of candidate answers and the common relationship to a user.

11. The apparatus of claim 10, wherein the instructions further cause the processor to determine the common relationship by determining an intersection of the relationships between terms in the subset of the plurality of candidate answers.

12. The apparatus of claim 10, wherein the instructions further cause the processor to determine the common relationship by:
searching a relationship data store comprising a plurality of entries, each entry corresponding to a relationship between a first found term and at least one second found term found during pre-processing of documents of at least one corpus; and
for a term found in a candidate answer in the plurality of candidate answers, identifying one or more entries in the relationship data store that match the term.

13. The apparatus of claim 12, wherein each entry in the relationship data store comprises a pair-wise relationship between a first term found during pre-processing of at least one document of a corpus, and a second term found during pre-processing of the at least one document of the corpus, based on relationships identified in the at least one document of the corpus through natural language processing of the at least one document of the corpus.

14. The apparatus of claim 13, wherein each entry in the relationship data store further comprises a corresponding frequency of occurrence value indicating a frequency at which a corresponding pairwise relationship was found in the at least one document of the corpus during the pre-processing.

15. The apparatus of claim 14, wherein the instructions further cause the processor to present the plurality of candidate answers and the common relationship to the user by generating a visual display of the plurality of candidate answers and the common relationship along with the corresponding frequency of occurrence value for the common relationship.

16. The apparatus of claim 15, wherein the visual display further comprises at least one evidence text passage from at least one document of a corpus that supports the common relationship, and wherein portions of at least one of the subset of the plurality of candidate answers or the evidence text passages are accentuated in the visual display based on a value corresponding to the frequency of occurrence value for the common relationship.

17. The apparatus of claim 10, wherein the instructions further cause the processor to determine the common relationship between terms in the subset of the plurality of candidate answers by:
presenting a graphical user interface (GUI) providing a first portion of the GUI for outputting the plurality of candidate answers, a second portion of the GUI for outputting a plurality of user selectable options for specifying a desired common relationship that the user wishes to have identified between the plurality of candidate answers, a third portion of the GUI for outputting the relationships between terms in the plurality of candidate answers and the common relationship between terms in the subset of the plurality of candidate answers, and a fourth portion of the GUI fir outputting evidence text passages from documents of a corpus that support the common relationship between terms in the subset of the plurality of candidate answers.

18. The apparatus of claim 10, wherein the instructions further cause the processor to present the plurality of candidate answers and the common relationship between terms in the subset of the plurality of candidate answers to the user by generating a visual display of the plurality of candidate answers and at least one evidence text passage from at least one document of a corpus that support the common relationship between terms in the subset of the plurality of candidate answers, with portions of at least one of the subset of the plurality of candidate answers, or the at least one evidence text passage, being accentuated in the visual display.

* * * * *